US012761353B2

(12) United States Patent
Hsu et al.

(10) Patent No.: US 12,761,353 B2
(45) Date of Patent: Oct. 13, 2026

(54) MEASUREMENT METHOD AND NON-CONTACT DISPLACEMENT DETECTION APPARATUS THEREOF

(71) Applicant: DELTA ELECTRONICS, INC., Taoyuan City (TW)

(72) Inventors: Min Hsu, Taoyuan City (TW); Shih-Ying Hsu, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 792 days.

(21) Appl. No.: 18/333,545

(22) Filed: Jun. 13, 2023

(65) Prior Publication Data

US 2024/0255639 A1 Aug. 1, 2024

(30) Foreign Application Priority Data

Jan. 31, 2023 (CN) ......................... 202310046813.3

(51) Int. Cl.

*G01S 17/06* (2006.01)
*G01S 7/481* (2006.01)
*G01S 7/497* (2006.01)

(52) U.S. Cl.

CPC ............ *G01S 17/06* (2013.01); *G01S 7/4814* (2013.01); *G01S 7/497* (2013.01)

(58) Field of Classification Search

CPC ........ G01S 17/06; G01S 7/4814; G01S 7/497; G01B 11/00; G01B 11/26; G01M 1/122

See application file for complete search history.

(56) References Cited

U.S. PATENT DOCUMENTS

| | | | |
|---|---|---|---|
| 8,797,515 | B2 | 8/2014 | Sugimoto |
| 2018/0328726 | A1 | 11/2018 | Tanaka et al. |
| 2022/0206123 | A1 | 6/2022 | Yamada et al. |

FOREIGN PATENT DOCUMENTS

| | | | | | |
|---|---|---|---|---|---|
| CN | 105518486 | B | * | 9/2017 | ............. G01S 17/88 |
| CN | 110440764 | B | * | 7/2021 | ............. H04N 23/64 |
| EP | 2671093 | B1 | | 1/2019 | |
| JP | 2012225898 | A | | 11/2012 | |
| TW | 201144750 | A | | 12/2011 | |
| TW | I580930 | B | | 5/2017 | |

* cited by examiner

*Primary Examiner* — Mekonen T Bekele

(74) *Attorney, Agent, or Firm* — CKC & Partners Co., LLC

(57) ABSTRACT

A measurement method for measuring a position and a tilt angle of a target object includes the following steps. A pixel deviation between a first pixel and a second pixel of the target object is calculated. The pixel deviation is substituted into a curve of tilt angle versus pixel deviation to obtain the tilt angle of the target object. A first target curve and a second target curve are selected according to the first pixel, the second pixel and the tilt angle. A zero-tilt angle is substituted into the first target curve and the second target curve, respectively, to obtain a pixel at the zero-tilt angle. The pixel at the zero-tilt angle is substituted into a position curve to obtain the position of the target object.

9 Claims, 12 Drawing Sheets

MEASUREMENT METHOD AND NON-CONTACT DISPLACEMENT DETECTION APPARATUS THEREOF

RELATED APPLICATIONS

This application claims priority to China Application Serial Number 202310046813.3, filed Jan. 31, 2023, which is herein incorporated by reference in its entirety.

BACKGROUND

Field of Invention

The disclosure relates to a measurement method. More particularly, the disclosure relates to a measurement method capable for a non-contact displacement detection apparatus to measure a position and a tilt angle of a target object.

Description of Related Art

In non-contact displacement detecting techniques, as a laser beam emitted from a non-contact displacement detection device hits a surface of a target object, the laser beam is reflected from the surface of the target object to the sensor so as to capture a light spot. As the position variation of the surface of the target object varies, light spots captured by the sensor correspond to various positions and light quantity distributions, centers of the light spots can be calculated according to the various positions and light quantity distributions, it can be converted into position information of the target object.

However, there is not only displacement but also tilt on a target object in actual situation. When a laser beam hits a first target object with a tilt angle, it reflects to the sensor to generate a first waveform (energy distribution); when the laser beam hits a second target object with a displacement but no tilt, it reflects to the sensor to generate a second waveform, but the second waveform overlaps with the first waveform. In this case, the sensor cannot distinguish the tilt angle, the displacement, or both the target object exactly has, it causes that the measuring outcomes of the sensor are inconclusive.

Therefore, how to provide a non-contact displacement detection apparatus to solve the above-mentioned problems is an important issue in this field.

SUMMARY

An embodiment of the disclosure provides a measurement method for measuring a position and a tilt angle of a target object. The measurement method in a measurement mode includes the following steps. A pixel deviation between a first pixel and a second pixel of the target object is calculated. The pixel deviation is substituted into a curve of tilt angle versus pixel deviation to obtain the tilt angle of the target object. A first target curve is selected from N first tilt angle curves according to the tilt angle and the first pixel, and a second target curve is selected from N second tilt angle curves according to the tilt angle and the second pixel. A zero-tilt angle is substituted into the first target curve and the second target curve, respectively, to obtain a pixel at the zero-tilt angle. The pixel at the zero-tilt angle is substituted into a position curve to obtain the position of the target object.

An embodiment of the disclosure provides a non-contact displacement detection apparatus. The non-contact displacement detection apparatus includes a light source, a beam splitter, a first sensor, a second sensor and a processing circuit. The light source is configured to provide a laser light to a surface of a target object. The beam splitter is configured to split a reflected light reflected from the surface into a first split light and a second split light. The first sensor is configured to receive the first split light to measure at least one first pixel. The second sensor is configured to receive the second split light to measure at least one second pixel. The processing circuit is coupled to the first sensor and the second sensor and is configured to execute the measurement method as mentioned above in a measurement mode to measure a position and a tilt angle of the target object.

The measurement method and the non-contact displacement detection apparatus of the present disclosure can obtain multiple linear functions to give a description of positions and tilt angles in a calibration mode in order to derive the tilt angle and the position of the target object according to the multiple linear functions in a measurement mode.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
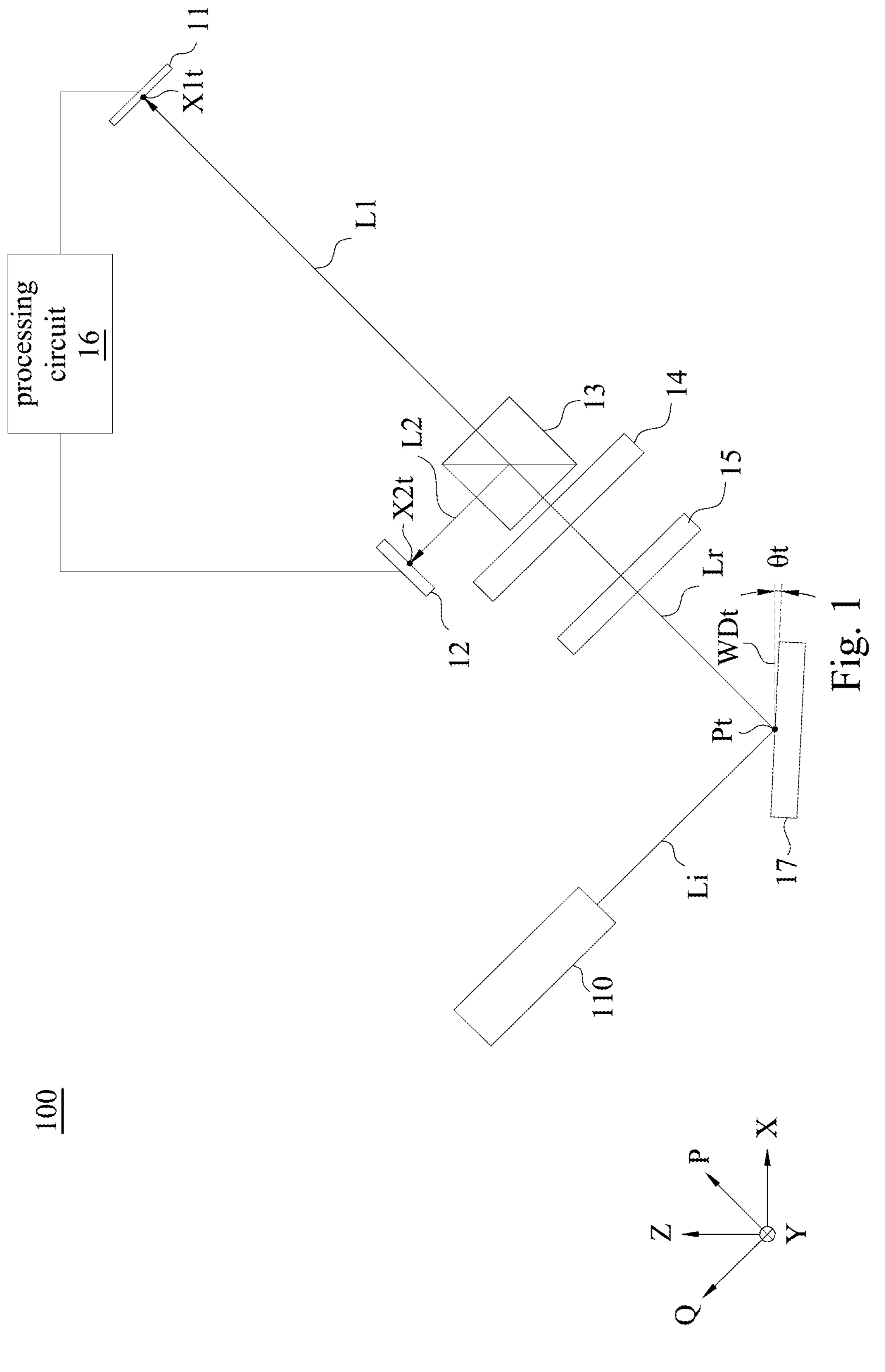
FIG. 1 is a schematic diagram illustrating a non-contact displacement detection apparatus according to some embodiments of the present disclosure.

FIG. 1 is a schematic diagram illustrating a non-contact displacement detection apparatus (hereinafter abbreviated detection apparatus) 100 according to some embodiments of the present disclosure. As shown in FIG. 1, the detection apparatus 100 includes a light source 110, a beam splitter 13, a sensor 11 (e.g., a first sensor), a sensor 12 (e.g., a second sensor), a processing circuit 16, a cover 15 and an aperture 14. In some embodiments, the processing circuit 16 can be implemented by a programmable logic controller, microprocessor, arithmetic logic unit, central processing unit, and the like. In one embodiment, the sensor 11 and 12 can be implemented by one dimensional linear imaging sensor. In another embodiment, the sensor 11 and 12 can be implemented by two dimensional array imaging sensor. In some embodiments, the sensor 11 and 12 can be implemented by a charge coupled device (CCD) imaging sensor, complementary metal-oxide semiconductor (CMOS) imaging sensor or other imaging sensor, which is not limited in the present disclosure.

In structure, the cover 15, the aperture 14, the beam splitter 13 and the sensor 11 are arranged along P axis. The beam splitter 13 and the sensor 12 are arranged along Q axis, wherein the P axis is vertical to the Q axis.

In operation, a laser light Li emitted from the light source 110 hits a surface (i.e., a reflected point Pt) of the target object 17, and a reflected light Lr is incident directly on the cover 15 and the aperture 14. The aperture 14 is coupled to and controlled by the processing circuit 16 to allow the reflected light Lr to enter the beam splitter 13. The beam splitter 13 splits the reflected light Lr into a first split light L1 direct to the sensor 11 and a second split light L2 reflected to the sensor 12.

In response to that the first split light L1 is incident on the sensor 11, the processing circuit 16 obtains a pixel position X1*t* of the sensor 11. In response to that the second split light L2 is incident on the sensor 12, the processing circuit 16 obtains a pixel position X2*t* of the sensor 12. Moreover, the processing circuit 16 calculates a position WDt along Z axis and a tilt angle θt relative to X axis according to the pixel position X1*t* of the sensor 11 and the pixel position X2*t* of the sensor 12, the Z axis is vertical to the X axis, and an angle between the Z axis and the Q axis is 45 degrees.

Figure 2:
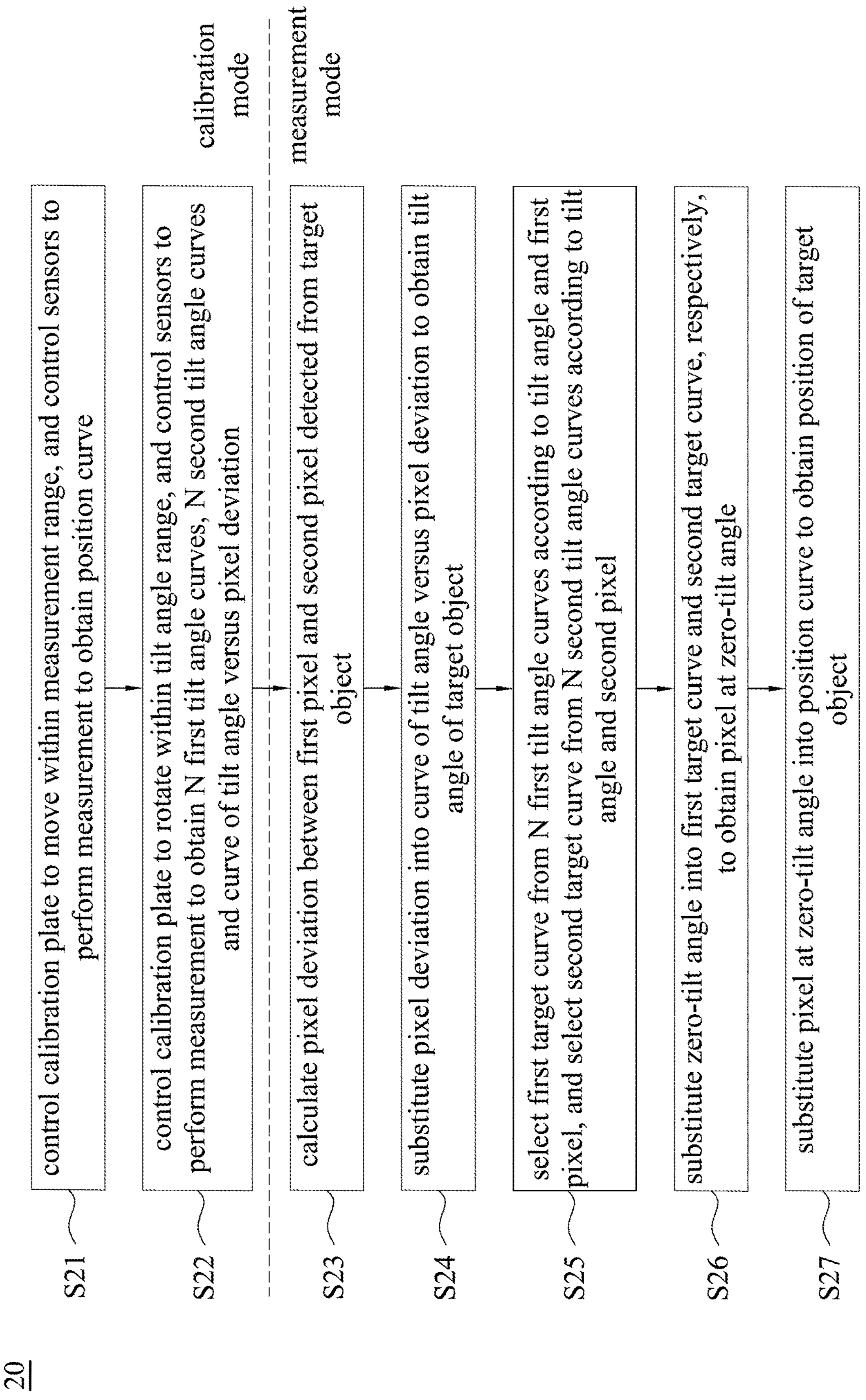
FIG. 2 is a flowchart illustrating a method for measuring a position and a tilt angle of a target object according to some embodiments of the present disclosure.

FIG. 2 is a flowchart illustrating a method 20 for measuring a position and a tilt angle of a target object according to some embodiments of the present disclosure. As shown in FIG. 2, the method 20 for measuring the position and the tilt angle of the target object includes the following steps S21~S27.

In step S21, a calibration plate is controlled to move within a measurement range, and sensors are controlled to perform measurement to obtain a position curve.

In step S22, the calibration plate is controlled to rotate within a tilt angle range, and the sensors is controlled to perform measurement to obtain N first tilt angle curves, N second tilt angle curves and a curve of tilt angle versus pixel deviation.

In step S23, a pixel deviation between a first pixel and a second pixel detected from a target object is calculated.

In step S24, the pixel deviation is substituted into a curve of tilt angle versus pixel deviation to obtain the tilt angle of the target object.

In step S25, a first target curve is selected from N first tilt angle curves according to the tilt angle and the first pixel, and a second target curve is selected from N second tilt angle curves according to the tilt angle and the second pixel.

In step S26, a zero-tilt angle is substituted into the first target curve and the second target curve, respectively, to obtain a pixel at the zero-tilt angle.

In step S27, the pixel at the zero-tilt angle is substituted into a position curve to obtain the position of the target object.

Based on the method 20, the present disclosure can obtain multiple linear functions (i.e., position curve, N first tilt angle curve, N second tilt angle curve and a curve of tilt angle versus pixel deviation) for describing positions and tilt angles in a calibration mode, so as to derive the tilt angle and the position of the target object according to the multiple linear functions in a measurement mode. Steps S21~S27 can be executed by the processing circuit 16. The processing circuit 16 executes steps S21~S22 in the calibration mode. The processing circuit 16 executes steps S23~S27 in the measurement mode.

Figure 3:
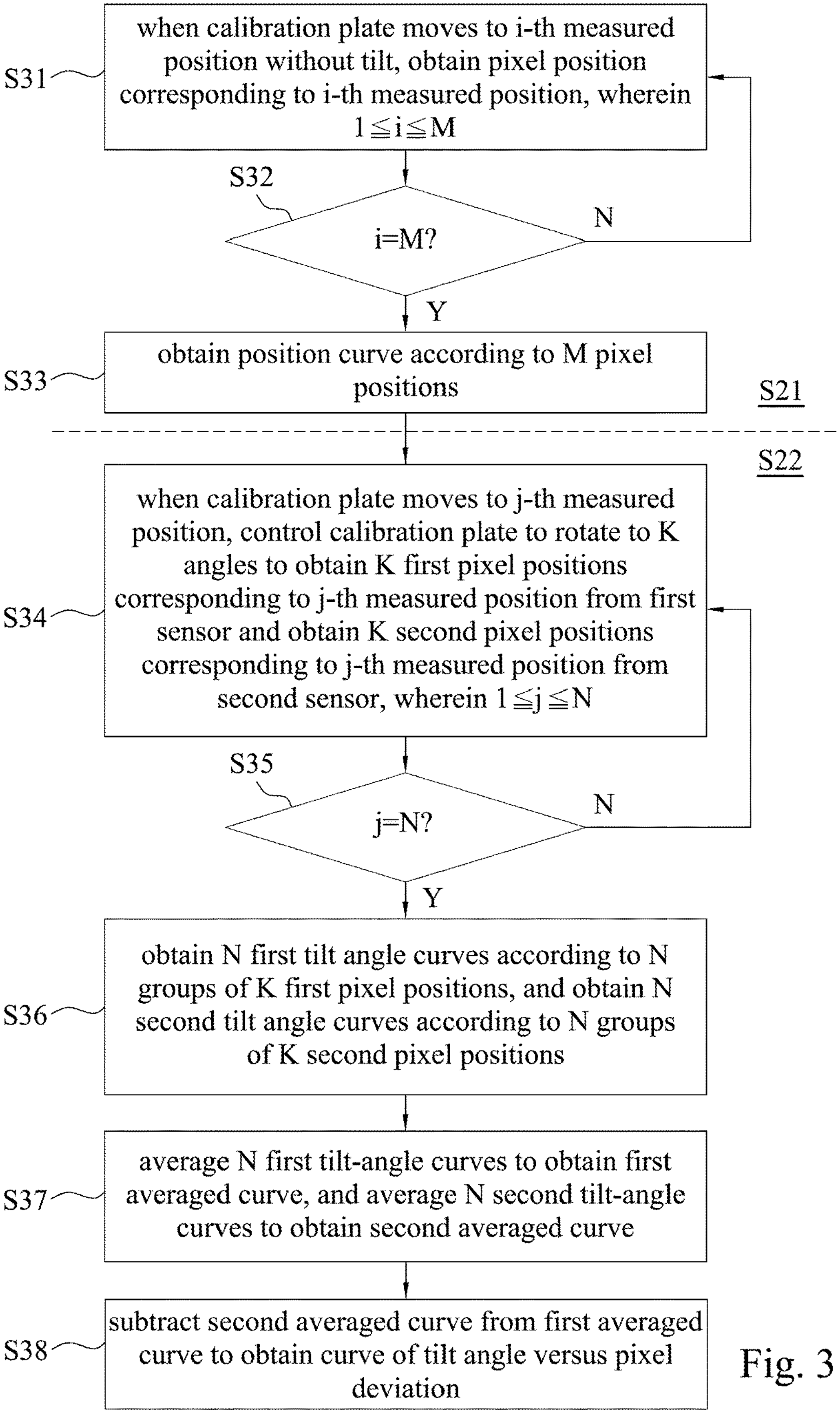
FIG. 3 is a flowchart illustrating steps S21, S22 of the method for measuring the position and the tilt angle of the target object in FIG. 2 according to some embodiments of the present disclosure.

FIG. 3 is a flowchart illustrating steps S21, S22 of the method 20 in FIG. 2 according to some embodiments of the present disclosure. As shown in FIG. 3, step S21 includes the following steps S31~S33. Step S22 includes the following steps S34~S38.

In step S31, when the calibration plate moves to i-th measured position without tilt, a pixel position corresponding to the i-th measured position is obtained, wherein 1≤i≤M.

In step S32, the processing circuit 16 determines whether i is equal to M or not. If YES, step S33 is executed; if No, step S31 is executed.

In step S33, the position curve is obtained according to the M pixel positions.

In step S34, when the calibration plate moves to j-th measured position, the calibration plate is controlled to rotate to K angles to obtain K first pixel positions corresponding to the j-th measured position from the first sensor and obtain K second pixel positions corresponding to the j-th measured position from the second sensor, wherein 1≤j≤N.

In step S35, the processing circuit 16 determines whether j is equal to K or not. If YES, step S36 is executed; if No, step S34 is executed.

In step S36, the N first tilt angle curves are obtained according to the N groups of K first pixel positions, and the N second tilt angle curves are obtained according to the N groups of K second pixel positions.

In step S37, the N first tilt-angle curves are averaged to obtain a first averaged curve, and the N second tilt-angle curves are averaged to obtain a second averaged curve.

In step S38, the second averaged curve is subtracted from the first averaged curve to obtain the curve of tilt angle versus pixel deviation.

To be noted that, in consideration that the laser lights received by the sensors 11, 12 are analogous energy distributions and some possible hardware errors, the present disclosure calculates an averaged curve of tilt angle versus pixel deviation in order to increase the stability of the detection apparatus 10 for determining the tilt angle and the position.

Figure 4:
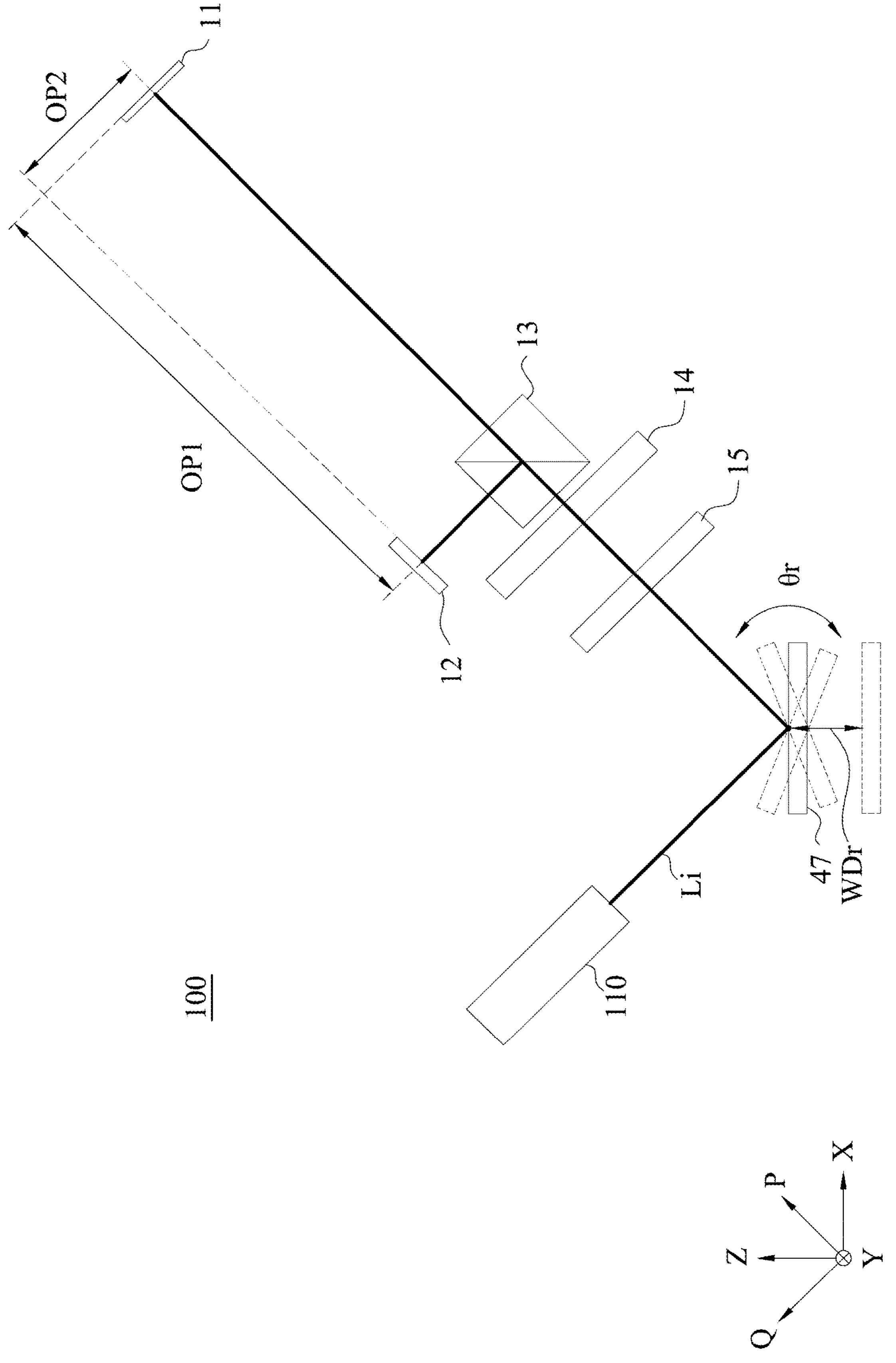
FIG. 4 is a schematic diagram illustrating a non-contact displacement detection apparatus and a calibration plate according to some embodiments of the present disclosure.

FIG. 4 is a schematic diagram illustrating a detection apparatus 100 and a calibration plate 47 according to some embodiments of the present disclosure. The calibration plate 47 is coupled to the processing circuit 16, and controlled by the processing circuit 16 in the calibration mode to move within a measurement range and rotate within a tilt angle range, wherein the target object 17 and the calibration plate 47 are highly reflective. The processing circuit 16 can control the calibration plate 47 to move within a measurement range along Z axis or Y axis, and the processing circuit 16 can control the calibration plate 47 to rotate within a tilt angle range relative to X axis, wherein the Z, Y and X axes are vertical to each other. In some embodiments, the calibration plate 47 can be fixed on a holder (not shown), the processing circuit 16 is coupled to and controls the holder to move or rotate in order to drive the calibration plate 47 to move or rotate. In some embodiments, a beam splitting surface 131 of the beam splitter 13 is arranged parallel to Z axis, wherein an angle α of 45 degrees is between axis Z and an imaging surface of the sensor 12. In this embodiment, a first optical path length OP1 from the beam splitter 13 to the sensor 11 is greater than a second optical path length OP2 from the beam splitter 13 to the sensor 12. In some embodiments, the first optical path length OP1 and the second optical path length OP2 are different, such that the sensors 11 and 12 can measure different results when the target object 17 and the calibration plate 47 tilt.

Figure 5:
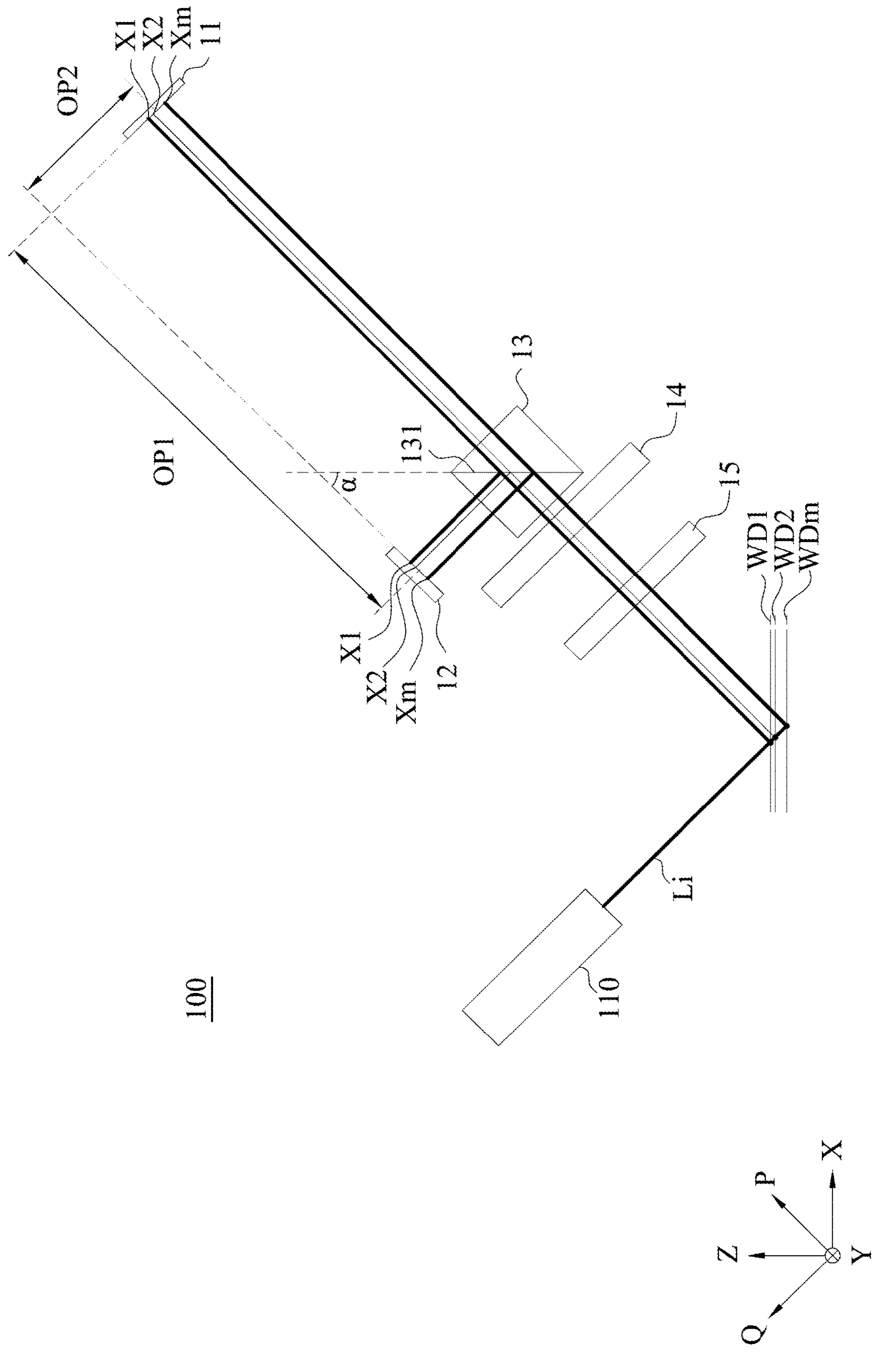
FIG. 5 is a schematic diagram illustrating a detection apparatus performing measurement to obtain a position curve according to some embodiments of the present disclosure.

FIG. 5 is a schematic diagram illustrating a detection apparatus 100 performing measurement to obtain a position curve according to some embodiments of the present disclosure. In step S21, the processing circuit 16 controls the calibration plate 47 to move within a measurement range WDr, and controls the sensor 11 and 12 to perform measurement to obtain the position curve. Specifically, in step S31, when the calibration plate 47 moves to i-th measurement position (e.g., one of measured positions WD1~WDm), the processing circuit 16 obtains a pixel position (e.g., one of the pixel positions X1~Xm) corresponding to the i-th measured position, in which 1≤i≤M, and i and M are positive integers, and the i-th measured position refers to any one of the M measurement positions. In some embodiments, the M can be implemented by 11 or other value.

In step S32, if the processing circuit 16 determines that i is equal to M, it means that the step S31 has been repeated M times and the position measurements without tilt has been completed, and then step S33 is going to execute. In step S33, the processing circuit 16 obtains points (X1, WD1)~(Xm, WDm) according to the M pixel positions measured at M measured positions so as to establish the position curve $Y_p$, as shown in FIG. 6.

Figure 6:
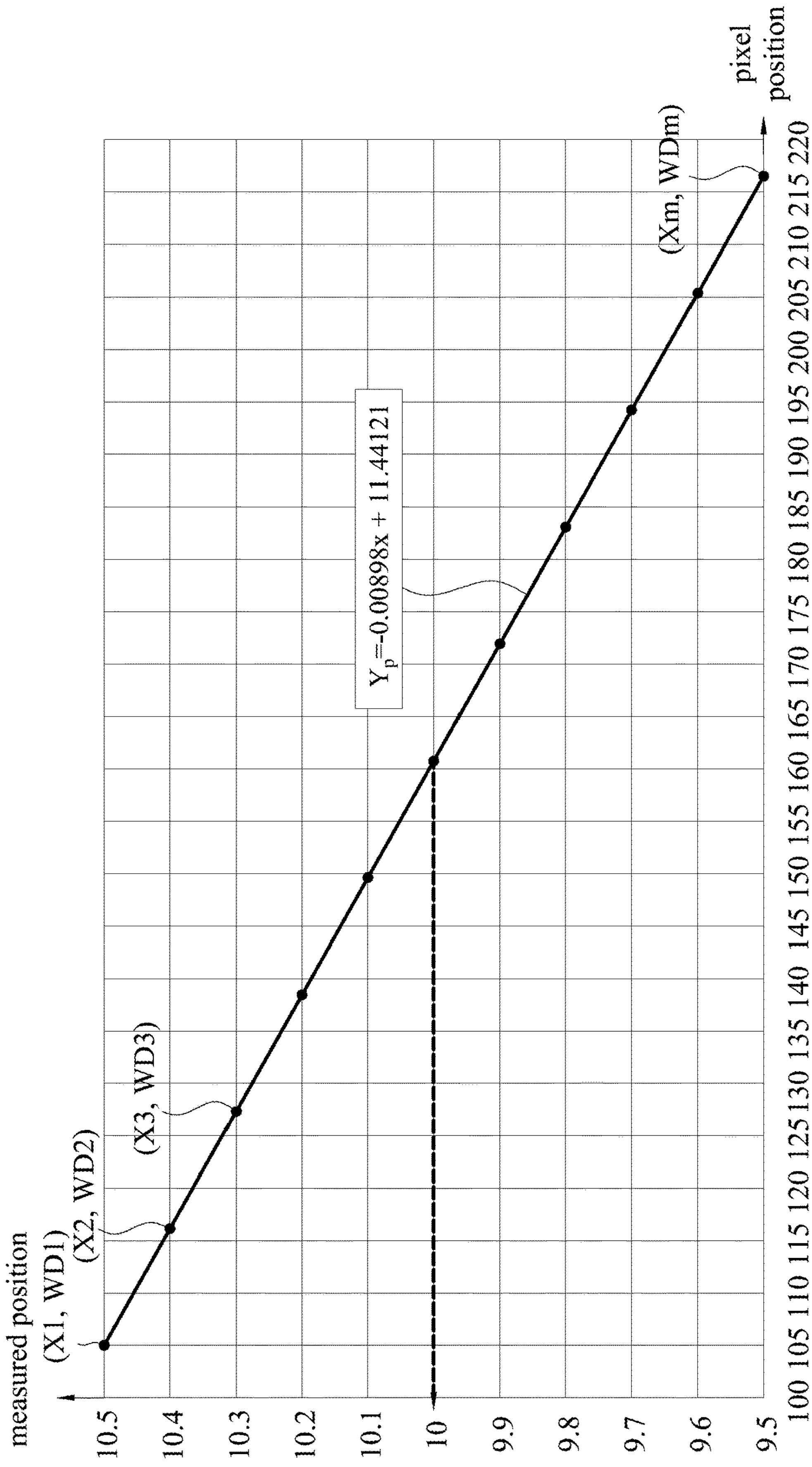
FIG. 6 is a schematic diagram illustrating a position curve according to some embodiments of the present disclosure.

FIG. 6 is a schematic diagram illustrating a position curve $Y_p$ of the sensors 11 and 12 according to some embodiments of the present disclosure. In some embodiments of the present disclosure, the processing circuit 16 can summarize the points (X1, WD1)~(Xm, WDm) into the position curve $Y_p$=–0.00898x+11.4411. In some embodiments, the measurement range WDr can be set in a range of 9.5 mm~10.5 mm or other range.

Based on optical theory, if the calibration plate 47 without tilt, the measuring results of the sensors 11 and 12 are substantially the same or similar, and thus the sensors 11 and 12 should have the same position curve $Y_p$.

Figure 7:
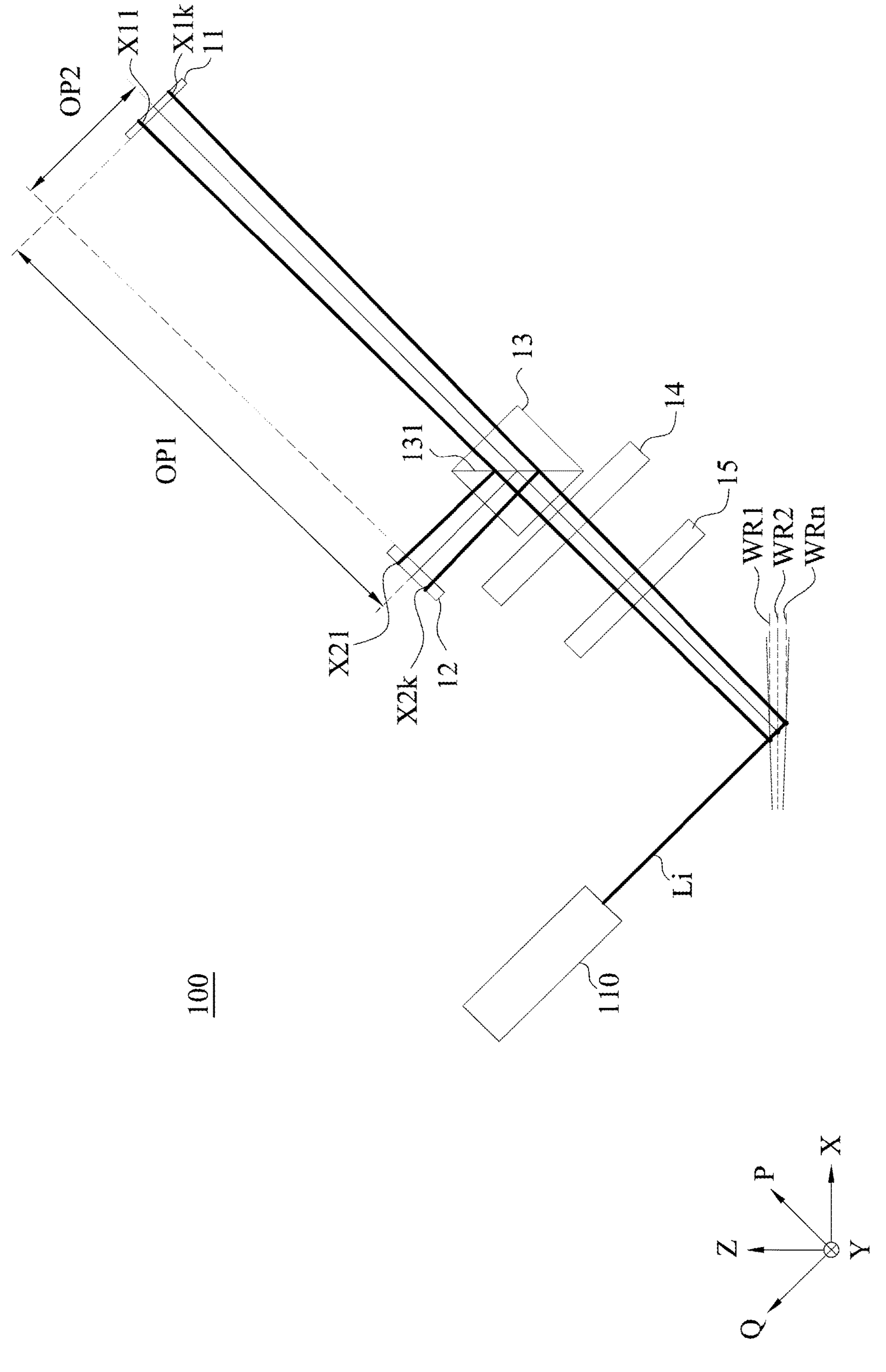
FIG. 7 is a schematic diagram illustrating a detection apparatus performing measurement to obtain first tilt angle curves and second tilt angle curves according to some embodiments of the present disclosure.

FIG. 7 is a schematic diagram illustrating a detection apparatus 100 performing measurement to obtain first tilt angle curves and second tilt angle curves according to some embodiments of the present disclosure. In step S22, the processing circuit 16 controls the calibration plate 47 to rotate within a tilt angle range Or, and controls the sensors 11 and 12 to perform measurement to obtain the N first tilt angle curves, the N second tilt angle curves and the curve of tilt angle versus pixel deviation.

In step S34, when the calibration plate 47 moves to j-th measured position (e.g., one of the measured positions WR1~WRn), the processing circuit 16 controls the calibration plate 47 to respectively tilt to K angles (e.g., –0.5°~0.5°) to obtain K first pixel positions (e.g., one of the first pixel positions X11~X1*k*) corresponding to the j-th measured positions and K second pixel positions (e.g., one of the second pixel positions X21~X2*k*) corresponding to the j-th measured positions, in which 1≤j≤N, and j and N are positive integers, and the j-th measured position refers to any one of the N measured positions.

In some embodiments, the said N can be any positive integers. In this embodiment, N is an integer of 3, the first measured position can be a farthest position (e.g., 10.5 mm) or a three quarters median (e.g., 10.3 mm) in the measurement range, the second measured position can be a medial position (e.g., 10 mm), a third measured position (or a final position) can be a nearest position (e.g., 9.5 mm) or one quarter median (e.g., 9.7 mm) in the measurement range. In some embodiments, the said K can be 11, the processing circuit 16 samples a pixel position per 0.1 degrees in the tilt range θr of –0.5°~0.5° so as to obtain 11 corresponding pixel positions.

In step S35, if the processing circuit 16 determines that j is equal to N, it means that the step S35 has been repeated N times and the position measurements with tilt has been completed, and then step S36 is going to execute. In step S36, the processing circuit 16 obtains N first tilt angle curves (e.g., the first tilt angle curves $y_1$~$y_3$) according to the N groups of K first pixel positions, and obtains N second tilt angle curves (e.g., the second tilt angle curves $y_1'$~$y_3'$) according to the N groups of K second pixel positions, as shown in FIG. 8.

Figure 8:
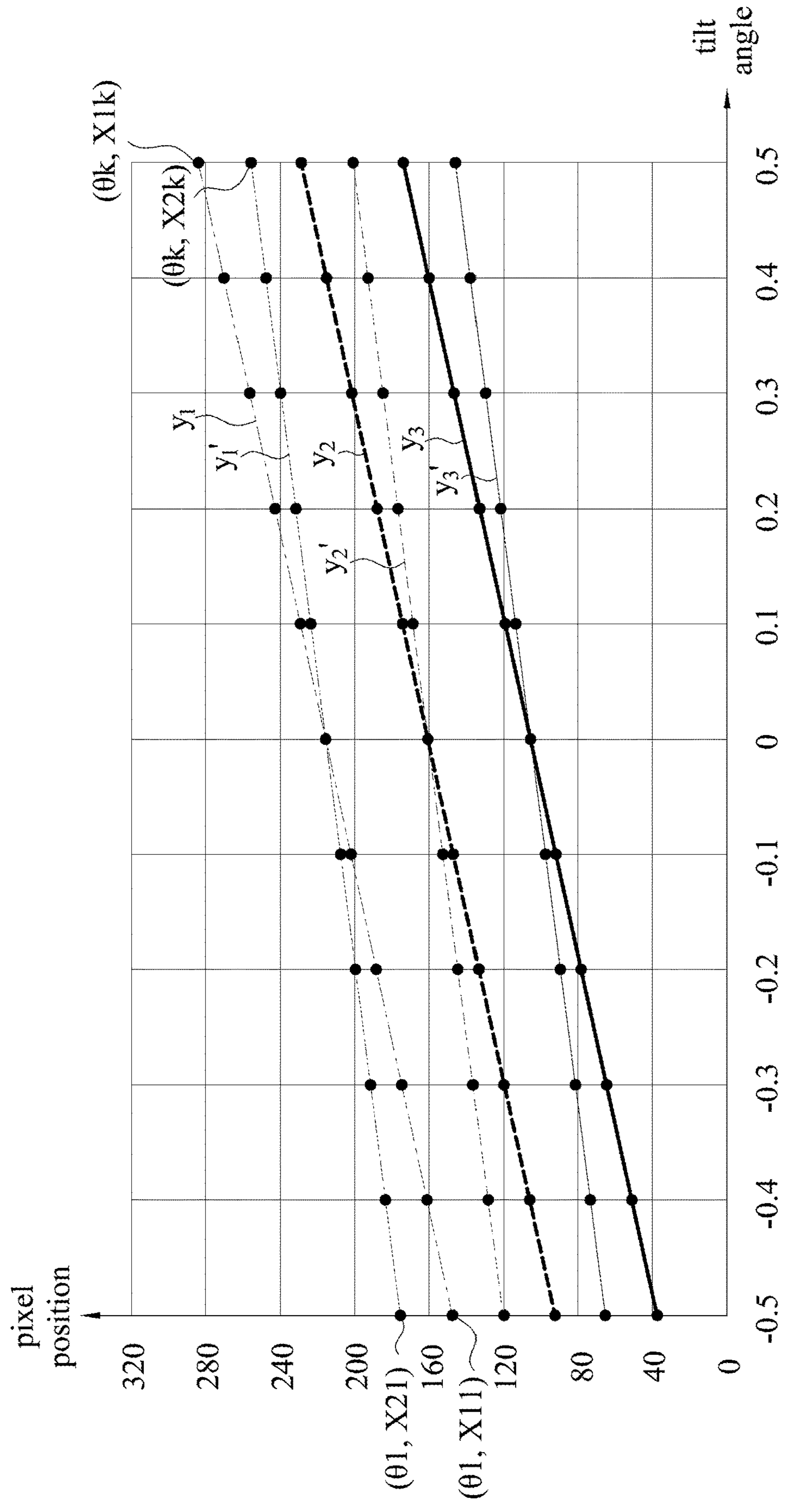
FIG. 8 is a schematic diagram illustrating first tilt angle curves and second tilt angle curves according to some embodiments of the present disclosure.

FIG. 8 is a schematic diagram illustrating first tilt angle curves $y_1$~$y_3$ and second tilt angle curves $y_1'$~$y_3'$ according to some embodiments of the present disclosure. In this embodiment, the processing circuit 16 can summarize the points (θ1, X11)~(θk, X1*k*), (θ1, X21)~(θk, X2*k*) into the first tilt angle curve $y_1$ and the second tilt angle curve $y_1'$. And so on, the processing circuit 16 can summarize the other points into the first tilt angle curves $y_2$~$y_3$ and the second tilt angle curves $y_2'$~$y_3'$. In this embodiment, the first tilt angle curves $y_1$~$y_3$ can be expressed by the following functions.

$$y_1 = a_1x + b_1$$

$$y_2 = a_2x + b_2$$

$$y_3 = a_3x + b_3$$

In this embodiment, the second tilt angle curves $y_1'$~$y_3'$ can be expressed by the following functions.

$$y_1' = a_1'x + b_1'$$

$$y_2' = a_2'x + b_2'$$

$$y_3' = a_3'x + b_3'$$

Ideally, the first tilt angle curves $y_1$~$y_3$ are linear functions parallel to each other, the slope thereof should be the same. However, in practice, the laser lights received by the sensors 11 and 12 are light spots with areas or light quantity distributions, causing that the slopes $a_1$, $a_2$, $a_3$ of the first tilt angle curves $y_1$~$y_3$ obtained at different measured positions are approximately but not substantially the same. Similarly, the slopes $a_1'$, $a_2'$, $a_3'$ of the second tilt angle curves $y'$~$y_3'$ are approximately the same. In addition, the coefficients are equal, $b_1=b_1'$, $b_2=b_2'$, $b_3=b_3'$, therefore, the first and second tilt angle curves corresponding to the same measured position have the same pixel positions when the tilt angle is equal to zero.

In step S37, the processing circuit 16 averages N first tilt angle curves to obtain a first averaged curve, and averages N second tilt angle curves to obtain a second averaged curve. For example, the processing circuit 16 averages 3 first tilt angle curves $y_1$~$y_3$ to obtain a first averaged curve Y1, and averages 3 second tilt angle curves $y_1$'~$y_3$' to obtain a second averaged curve Y2, as shown in the following functions.

$$Y1 = \frac{y_1 + y_2 + y_3}{3}$$

$$Y2 = \frac{y_1' + y_2' + y_3'}{3}$$

Figure 9:
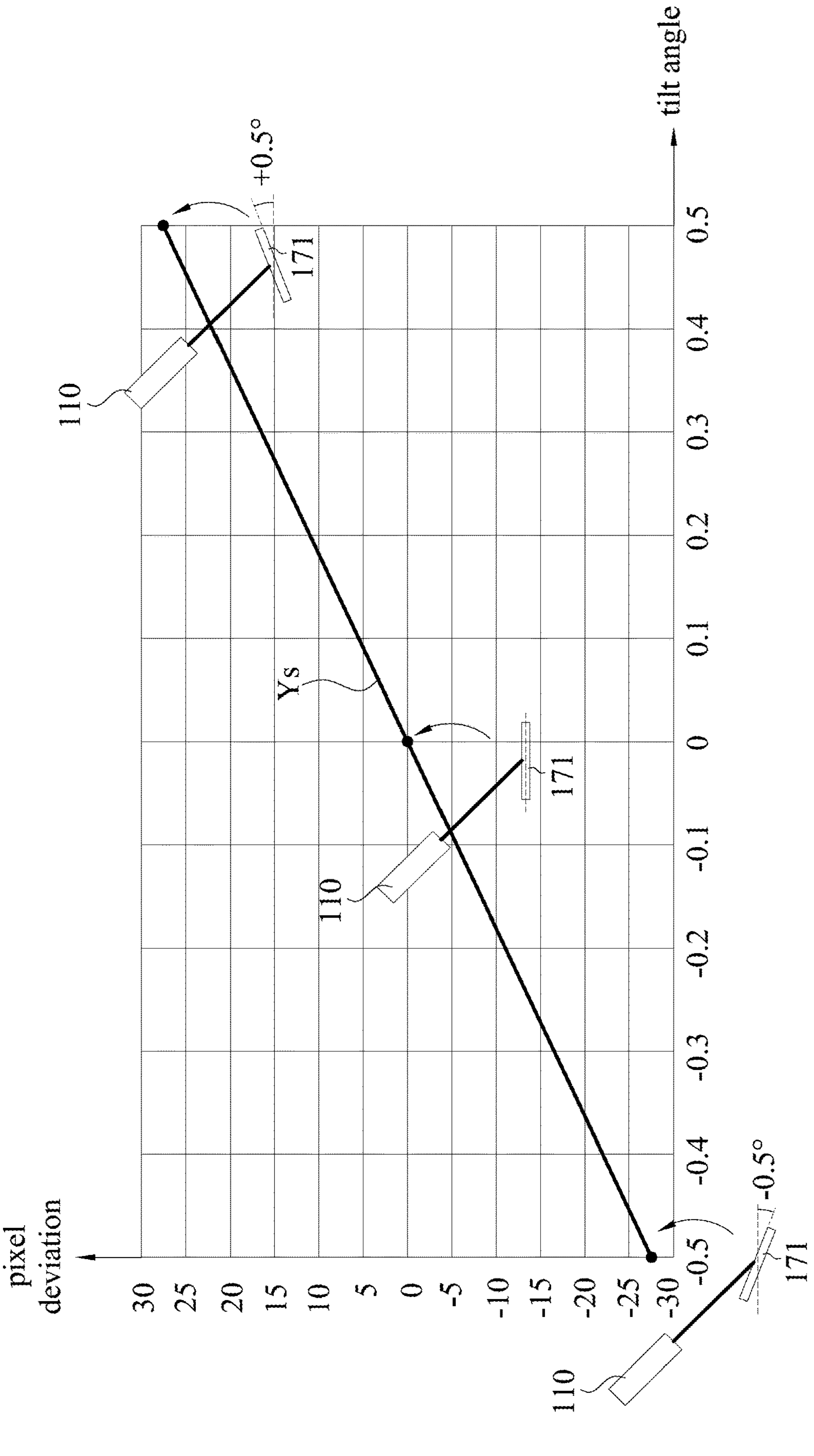
FIG. 9 is a schematic diagram illustrating a curve of pixel deviation versus tilt angle according to some embodiments of the present disclosure.

FIG. 9 is a schematic diagram illustrating a curve Y5 of pixel deviation versus tilt angle according to some embodiments of the present disclosure. In step S38, the processing circuit 16 subtracts the second averaged curve Y2 from the first averaged curve Y1 to obtain the curve $Y_5$ of tilt angle versus pixel deviation, as shown in the following equation.

$$Ys = \frac{(y_1 + y_2 + y_3)}{3} - \frac{(y_1' + y_2' + y_3')}{3}$$

In the measurement mode, the processing circuit 16 executes the step S23~S27 to calculate a tilt angle θt and a position WDt of the target object 17 according to the curve of tilt angle versus pixel deviation $Y_5$, the first tilt angle curves $y_1$~$y_3$, the second tilt angle curves y'~$y_3$' and the position curve $Y_p$ which are obtained in the calibration mode.

Figure 10:
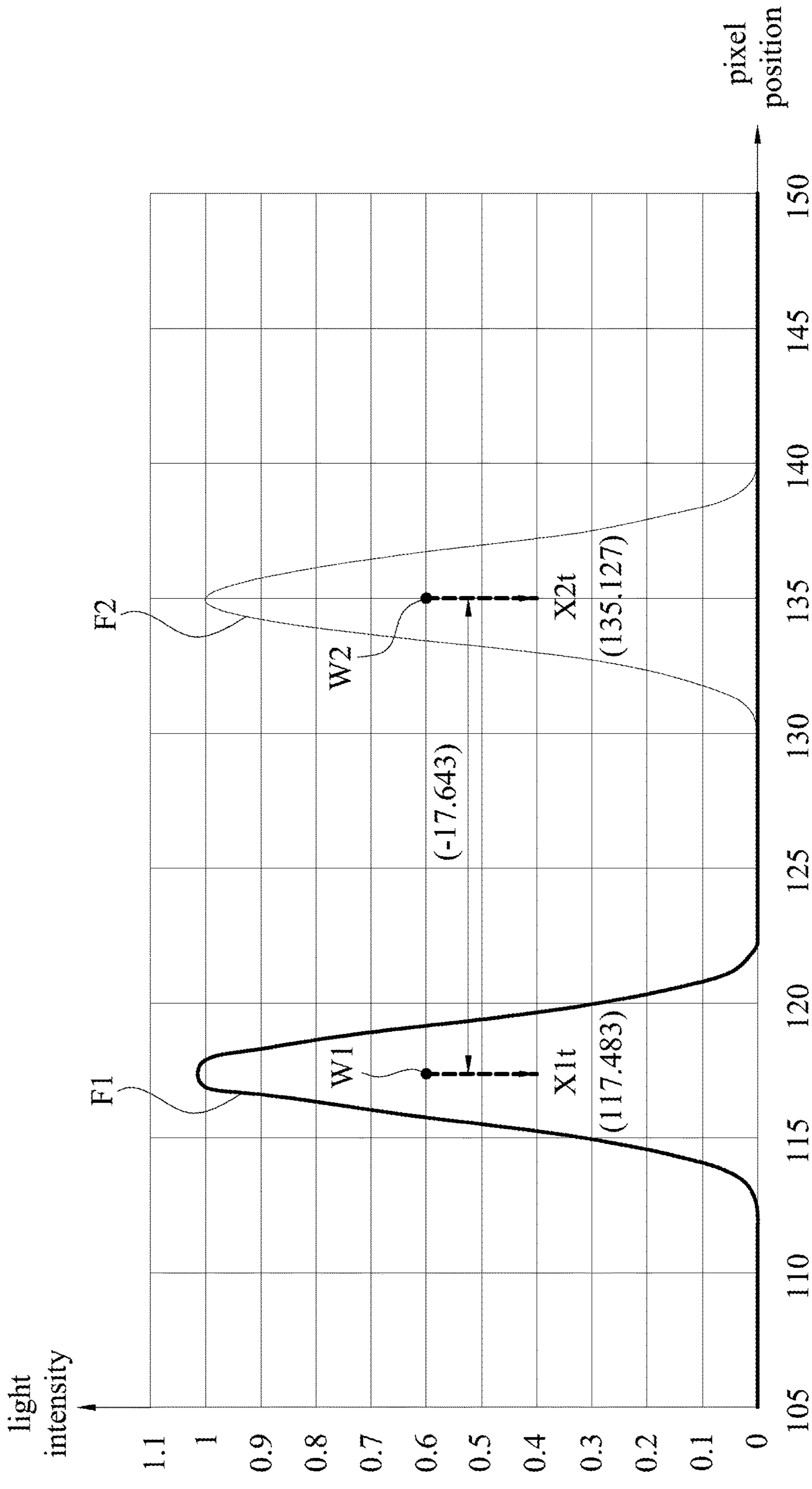
FIG. 10 is a schematic diagram illustrating a non-contact displacement detection apparatus measuring a target object to obtain pixel positions according to some embodiments of the present disclosure.

FIG. 10 is a schematic diagram illustrating a detection apparatus 100 measuring a target object 17 to obtain a first pixel W1 and a second pixel W2 according to some embodiments of the present disclosure. In step S23, the processing circuit 16 calculates a pixel deviation between the first pixel W1 and the second pixel W2, wherein the first pixel W1 can be considered as a center of the first waveform F1 which corresponds to a first pixel position X1*t*, and the second pixel position W2 can be considered as a center of the second waveform F2 which corresponds to a second pixel position X2*t*. The processing circuit 16 outputs a difference (e.g., −17.643) between the first pixel position X1*t* and the second pixel position X2*t* as the pixel deviation. In an embodiment, a maximum light intensity of the first waveform F1 corresponds to the first pixel position X1*t*, and a maximum light intensity of the first waveform F2 corresponds to the second pixel position X2*t*.

Figure 11:
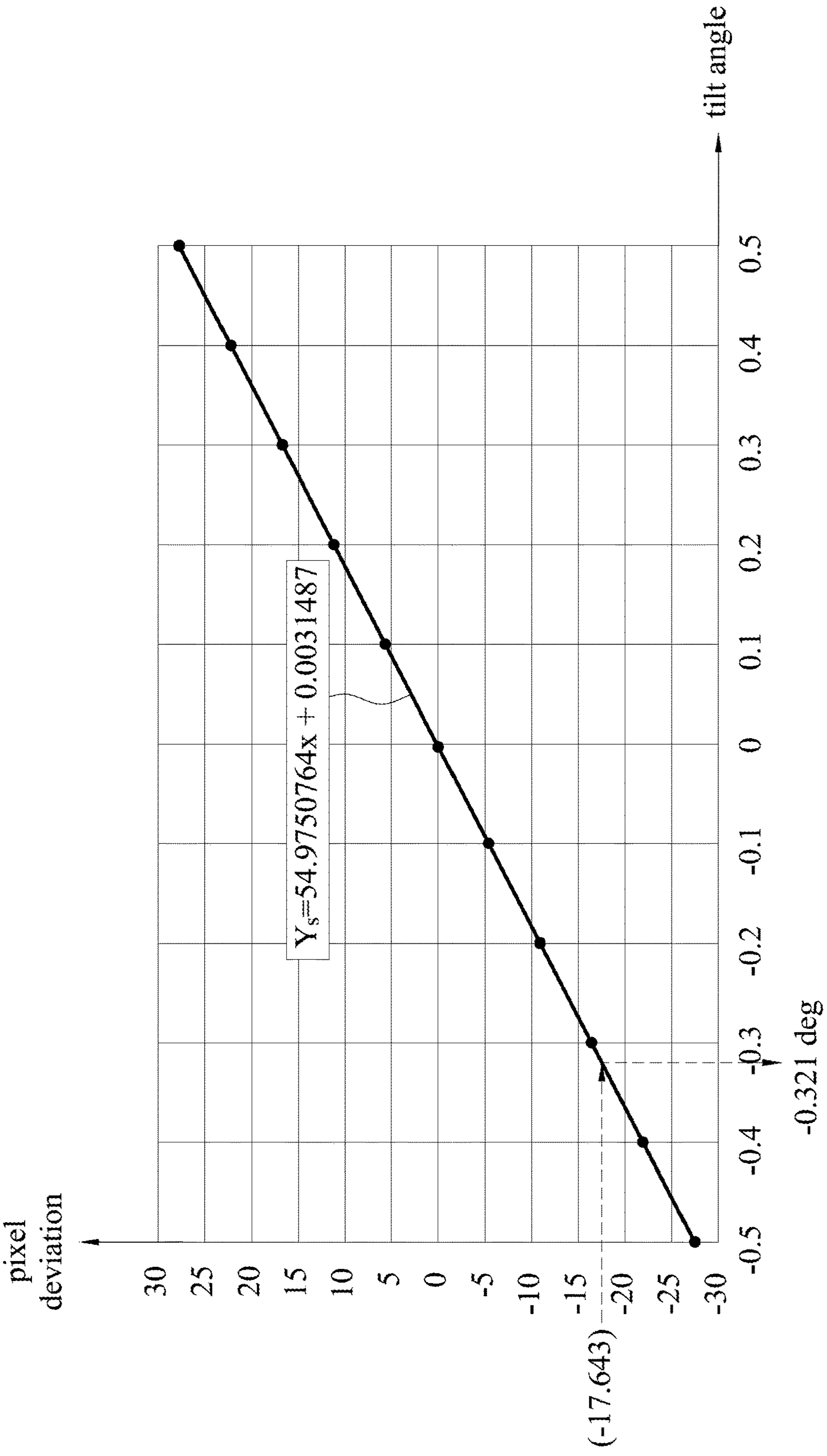
FIG. 11 is a schematic diagram illustrating a tilt angle of the target object obtained from a pixel deviation according to some embodiments of the present disclosure.

FIG. 11 is a schematic diagram illustrating a tilt angle θt of the target object 17 obtained from pixel deviation according to some embodiments of the present disclosure. In step S24, the processing circuit 14 substitutes the pixel deviation into the curve $Y_5$ of pixel deviation versus tilt angle to obtain the tilt angle of the target object 17. For example, the curve $Y_5$ of pixel deviation versus tilt angle curve $Y_5$, obtained after the calibration mode is performed, can be expressed by the following function.

$$Y_s = 54.9750764x + 0.0031487$$

The processing circuit 16 substitutes a pixel deviation, −17.643, into the curve $Y_s$ of pixel deviation versus tilt angle to obtain a tilt angle, −0.321°, of the target object 17.

Figure 12:
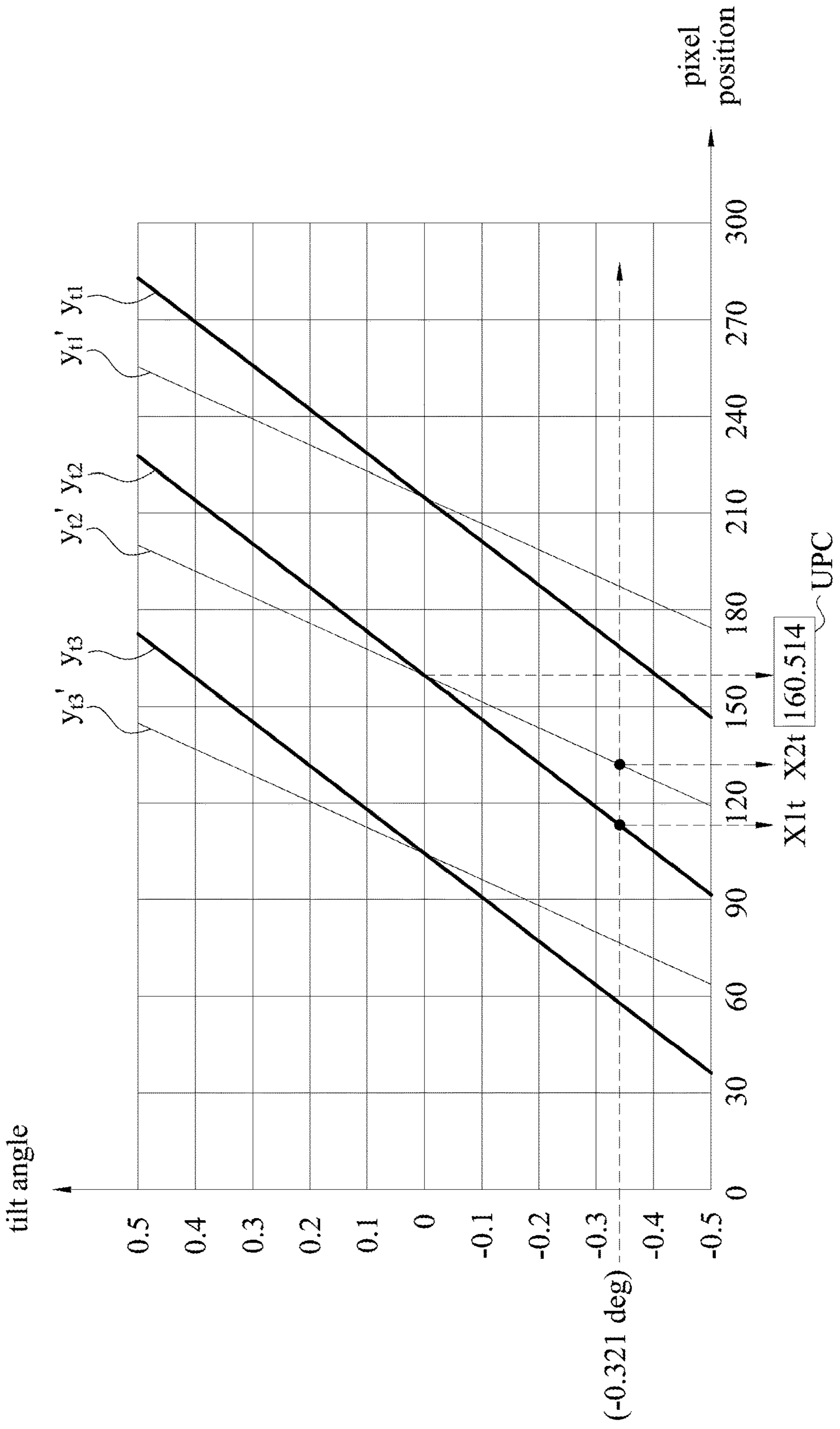
FIG. 12 is a schematic diagram illustrating a pixel at zero-tilt angle obtained from the tilt angle of the target object according to some embodiments of the present disclosure.

FIG. 12 is a schematic diagram illustrating a calibrated pixel position obtained from the tilt angle θt of the target object 17 according to some embodiments of the present disclosure, wherein coordinate axes in FIG. 12 and FIG. 7 are swapped. In step S25, the processing circuit 16 selects a first target curve from N first tilt angle curves according to the tilt angle and the first pixel, and the processing circuit 16 selects a second target curve from N second tilt angle curves according to the tilt angle and the second pixel. For example, the processing circuit 16 forms a point (117.483, −0.321) according to pixel position X1*t* corresponding to the first pixel and the tilt angle θt, and the processing circuit 16 selects a first tilt angle curve $y_{t2}$ which passes through the point (117.483, −0.321) from the first tilt angles curve $y_{t1}$~$y_{t3}$, as the first target curve. Similarity, the processing circuit 16 forms a point (135.127, −0.321) according to the pixel position X2*t* corresponding to the second pixel and tilt angle θt, and the processing circuit 16 selects a second tilt angle curve $y_{t2}$' which passes through the point (135.127, −0.321) from the second tilt angles curve $y_{t1}$'~$y_{t3}$', as the second target curve.

In step S26, the processing circuit 16 substitutes the zero-tilt angle into the first tilt angle curve $y_{t2}$ which is selected as the first target curve to obtain a pixel UPC at the zero-tilt angle. Moreover, the processing circuit 16 substitutes the zero-tilt angle into the second tilt angle curve $y_{t2}$' obtain the pixel UPC at the zero-tilt angle, such as the pixel UPC at the zero-tilt angle can be 160.514.

In step S27, the processing circuit 16 substitutes the pixel UPC at the zero-tilt angle into the position curve $Y_p$ to obtain the position WDt of the target object 17. For example, the position curve $Y_p$ can be expressed by the following equation.

$$Y_p = 0.00898x + 11.44121$$

The processing circuit 16 substitutes the pixel UPC at the zero-tilt angle, 160.514, into a variable x of the position curve $Y_p$ to obtain the position WDt of 10 mm of the target object 17, as shown in FIG. 6.

Simply speaking, the embodiment from FIG. 2 to FIG. 12 of the present disclosure provides a method for deriving tilt angle and position of target object by utilizing one dimensional calibration or scanning. The present disclosure further provides a method for deriving tilt angle and position of target object by utilizing two dimensional calibration or scanning, which includes the following steps.

Step 1), in a calibration mode, the calibration plate 47 is controlled to be moved along Z axis in a measurement range, and then steps S31 to S33 are executed to obtain a position curve along Z axis.

Step 2), the calibration plate 47 is controlled to rotate within a tilt angle range, and then steps S34 to S38 are executed to obtain N first tilt angle curves, N second tilt angle curves and a curve of tilt angle versus pixel difference corresponding to Z axis.

Step 3), the calibration plate 47 is controlled to move along Y axis in the measurement range, and then steps S31 to S33 are executed to obtain an auxiliary position curve along Y axis, wherein Y axis is vertical to axes X, Z, P and Q.

Step 4), the calibration plate 47 is controlled to rotate within the tilt angle range, and then steps S34 to S38 are executed to obtain N first auxiliary tilt angle curves, N second auxiliary tilt angle curves and an auxiliary curve of tilt angle versus pixel difference corresponding to Y axis.

Step 5), in a measurement mode, step S23 to step S27 are executed to obtain a first tilt angle and a position of a target object according to the position curve, the N first tilt angle curves, the N second tilt angle curves and the curve of tilt angle versus pixel difference corresponding to Z axis.

Step 6), step S23 to step S27 are executed to obtain a second tilt angle and the position of the target object 17 according to the auxiliary position curve, the N first auxiliary tilt angle curves, the N second auxiliary tilt angle curves and the auxiliary curve of tilt angle versus pixel difference corresponding to Y axis.

In summary, the detection apparatus 100 of the present disclosure utilizes the sensors 11 and 12 to receive the lights reflected form the target object 17 in two optical paths with different distances in order to calculate the tilt angle and position of the target object 17 according to the pixel deviation between two sensors 11 and 12. Furthermore, the curve of tilt angle versus pixel deviation $Y_s$ of the detection apparatus 100 is obtained by averaging multiple first tilt angle curves and multiple second tilt angle curves so as to increase the detection accuracy.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A measurement method, for measuring a position and a tilt angle of a target object, the measurement method comprising a calibration mode and a measurement mode:

during the calibration mode:

f) controlling a calibration plate to move within a measurement range, and controlling a first sensor and a second sensor to perform measurement to obtain a position curve; and g) controlling the calibration plate to rotate within a tilt angle range, and controlling the first sensor and the second sensor to perform measurement to obtain N first tilt angle curves, N second tilt angle curves and a curve of tilt angle versus pixel deviation, during the measurement mode:

a) calculating a pixel deviation between a first pixel and a second pixel of the target object, wherein the first pixel of a first waveform corresponds to a first pixel position, the second pixel of a second waveform corresponds to a second pixel position, and a difference between the first pixel position and the second pixel position is outputted as the pixel deviation;

b) substituting the pixel deviation into the curve of tilt angle versus pixel deviation to obtain the tilt angle of the target object;

c) selecting a first target curve from the N first tilt angle curves according to the tilt angle and the first pixel, and selecting a second target curve from the N second tilt angle curves according to the tilt angle and the second pixel;

d) substituting a zero-tilt angle into the first target curve and the second target curve, respectively, to obtain a pixel at the zero-tilt angle; and e) substituting the pixel at the zero-tilt angle into the position curve to obtain the position of the target object.

2. The measurement method of claim 1, wherein the step f) comprises:

f1) when the calibration plate moves to an i-the measured position without tilt, obtaining a pixel position corresponding to the i-the measured position, wherein 1≤i≤M;

f2) repeating the step f1) to obtain M pixel positions; and f3) obtaining the position curve according to the M pixel positions.

3. The measurement method of claim 1, wherein the step g) comprises:

g1) when the calibration plate moves to a j-the measured position, controlling the calibration plate to respectively rotate to K angles, to obtain K first pixel positions corresponding to the j-the measured position from the first sensor, and to obtain K second pixel positions corresponding to the j-the measured position from the second sensor, wherein 1≤j≤N;

g2) repeating the step g1) to obtain N groups of K first pixel positions and N groups of K second pixel positions; and g3) obtaining the N first tilt angle curves according to the N groups of K first pixel positions, and obtaining the N second tilt angle curves according to the N groups of K second pixel positions.

4. The measurement method of claim 3, wherein the step g) further comprises:

g4) averaging the N first tilt angle curves to obtain a first averaged curve, and averaging the N second tilt angle curves to obtain a second averaged curve; and g5) subtracting the second averaged curve from the first averaged curve to obtain the curve of tilt angle versus pixel deviation.

5. The measurement method of claim 3, wherein when the N is equal to 3, the calibration plate moves to an initial position, a medial position and a final position, respectively, and the M and the K are equal to 11.

6. The measurement method of claim 4, further comprising: during the calibration mode:

1) controlling the calibration plate to move within the measurement range along a first axis, and executing the step f1) to the step f3) to obtain the position curve along the first axis;

2) controlling the calibration plate to rotate within the tilt angle range and executing the step g1) to the step g5) to obtain the N first tilt angle curve, the N second tilt angle curve and the curve of tilt angle versus pixel deviation corresponding to the first axis;

3) controlling the calibration plate to move within the measurement range along a second axis, and executing the step f1) to the step f3) to obtain an auxiliary position curve along the second axis; and 4) controlling the calibration plate to rotate within the tilt angle range and executing the step g1) to the step g5) to obtain N first auxiliary tilt angle curve, N second auxiliary tilt angle curve and an auxiliary curve of tilt angle versus pixel deviation corresponding to the second axis;

wherein the first axis is vertical to the second axis.

7. The measurement method of claim 6, further comprising: during the measurement mode:

5) executing the step a) to the step e), to obtain a first tilt angle and the position of the target object, according to the position curve, the N first tilt angle curve, the N second tilt angle curve and the curve of tilt angle versus pixel deviation corresponding to the first axis; and 6) executing the step a) to the step e), to obtain a second tilt angle and the position of the target object, according to the auxiliary position curve, the N first auxiliary tilt angle curve, the N second auxiliary tilt angle curve and the auxiliary curve of tilt angle versus pixel deviation corresponding to the second axis.

8. A non-contact displacement detection apparatus, comprising:

a light source configured to provide a laser light to a surface of a target object;

a beam splitter configured to split a reflected light reflected from the surface into a first split light and a second split light;

a first sensor configured to receive the first split light to measure at least one first pixel;

a second sensor configured to receive the second split light to measure at least one second pixel; and a processing circuit coupled to the first sensor and the second sensor, and configured to execute the measurement method of claim 1 in a measurement mode to measure a position and a tilt angle of the target object.

9. The non-contact displacement detection apparatus of claim 8, further comprising:

a calibration plate coupled to the processing circuit, and controlled by the processing circuit in a calibration mode to move within a measurement range and to rotate within a tilt angle range, wherein the target object and the calibration plate are highly reflective; and an aperture coupled to the processing circuit, and controlled by the processing circuit to allow the reflected light to enter the beam splitter; wherein:

the calibration plate moves within the measurement range along a first axis or a second axis, and the calibration plate rotates within the tilt angle range relative to a third axis, wherein the first axis, the second axis and the third axis are vertical to each other;

the aperture, the beam splitter and the first sensor are arranged along a fourth axis, the beam splitter and the second sensor are arranged along a fifth axis, the fourth axis is vertical to the fifth axis, and an angle between the fourth axis and the first axis is 45 degrees; and a first optical path from the beam splitter to the first sensor is different from a second optical path from the beam splitter to the second sensor.

* * * * *